Patented Oct. 24, 1922.

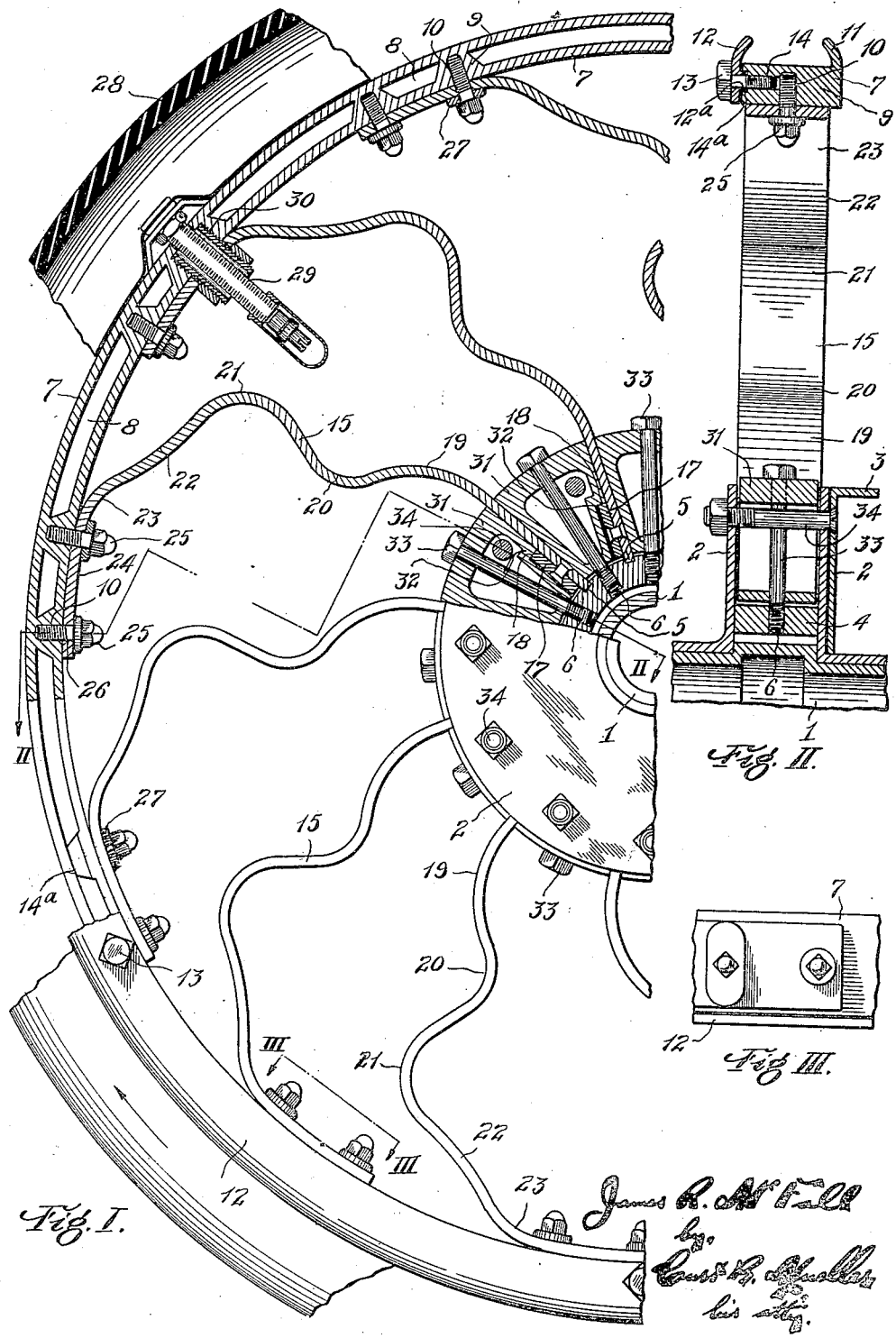

1,432,884

UNITED STATES PATENT OFFICE.

JAMES R. McFALL, OF CLEVELAND, OHIO.

RESILIENT WHEEL.

Application filed January 5, 1921. Serial No. 435,065.

*To all whom it may concern:*

Be it known that I, JAMES R. McFALL, a citizen of the United States, residing at 1742 E. 23d St., Cleveland, in the State of Ohio and Cuyahoga County, have invented a new and useful Improvement in Resilient Wheels, of which the following is a specification, the principle of the invention being herein explained and the best mode in which I have contemplated applying that principle, so as to distinguish it from other inventions.

My invention relates to a resilient wheel and more particularly to improvements in the shape of the spokes and the manner of connecting them both with the hub and the rim. The disclosure of this application may be considered a modification of what I showed described and claimed in my co-pending application under similar title filed June 19, 1919, Serial No. 305,298.

The objects of this invention have been successfully realized by practical demonstration and are as follows: the design of a wheel whose rim will remain a true circle in action, while all the spokes participate in distributing the load to which they are subjected, whether it be a light, medium, heavy or excessive load; to provide a demountable rim for the support of either solid or pneumatic tires; to so shape the spokes that all forward traction of the wheel is obtained by tension or endwise pulling; contributing to this desired end is the angle in which each spoke is secured at the hub and also the peculiar configuration of the spokes including five alternately reversed bends or curves which are calculated to allow compression or tension, as the case may be, for any load not exceeding the standard carrying capacity of the vehicle, to produce a resilient wheel, the construction of which will resist vibration and exclude the possibility of any spoke or spokes delivering direct blows to the axle.

Adverting to the drawings:

Figure I is a part section and part elevation of the side of about half of a wheel embodying my invention.

Figure II is a section taken on zigzag line II—II of Figure I.

Figure III is a view on line III—III of Figure I looking toward the rim.

A hub 1 carries a pair of spaced flanges 2 to the inner one of which is secured a brake drum 3. Loose about the hub 1 is a hub collar 4 the periphery of which is provided with a plurality of shallow radially directed recesses 5. Between each pair of such recesses the collar 4 is provided with a threaded opening 6.

A rim 7 includes hollow portions 8 and solid portions 9 alternately arranged in a circumferential direction. Each solid section 9 is provided with a threaded opening 10 to which entry is had from a central direction. One side of the rim 7 carries integrally an annular claw 11 clearly shown in Figure II. A detachable complementary claw or clincher flange 12 may be secured to the opposite side of the rim 7 by means of cap screws 13 to be passed through the flange 12 into threaded engagement with openings 14 in the solid sections 9 of the rim 7 as also clearly appears in Figure II. It is to be observed that the inner side of the flange 12 is fashioned with tapered projections 12$^a$ through which the screws 13 pass, such projections being purposed to have a wedge fit in the enlarged ends 14$^a$ of the openings 14.

Spokes 15 I give a peculiar configuration. Inasmuch as, with one exception, the attachment of all the spokes is the same the singular number will be employed in the description thereof. The inner end, or that end to be attached at the hub, is fitted into the recess 5 and just outside of the same has riveted to it a lug 17 to form a square shoulder 18. The advantages of my wheel construction are best realized if the wheel rolls in the direction toward which the spokes gradually advance from their point of connection with the hub toward their point of connection with the rim. I prefer the wheel to be used so as ordinarily to turn in the direction indicated by the arrow in Figure I. Commencing nearest the hub, each spoke is first slightly curved in a forwardly direction at 19, then more sharply curved backwardly at 20 then still more sharply curved forwardly at 21 then given two relatively reversed additional curves 22 and 23 to finally end as a section or shoe 24, toe and heel positions of which are both secured by means of cap screws 25 passed through openings 26 and engaging in the threaded openings 10. Washers 27 may be advantageously employed at these points of attachment. In action the rotation of the wheel is preferably such that the heel of each spoke first comes directly underneath the axis of the wheel. By shaping a spoke as I have, the points of stress and relative measure of deflection of each spoke vary according to the load, the roadway and speed of rotation, some of the spokes at any moment being under tension and others under compression. While the rim is to remain substantially a true circle the hub 1 will move toward the lower half and recede from the upper half of it.

When a pneumatic tire is to be attached it becomes necessary to provide a valve structure. I have accordingly shown a portion of a pneumatic tire 28 to which is attached a conventional type of valve structure 29 in threaded connection at 30 through a somewhat larger solid section of the rim.

In order to hold the spokes in the recesses 5 in the hub collar I provide hollow blocks 31 each provided on one side with a recess forming a shoulder 32 adapted to engage the shoulder 18. Cap screws 33 are then passed radially through the blocks and caused to enter the threaded openings 6 in the hub collar. The blocks 31 are additionally held in place by attachment both to the flange 2 and to the brake flange 3 by means of bolt and nut combinations 34 which extend in an axial direction.

I claim:—

1. A resilient wheel comprising a rim, a hub, resilient spokes, means for connecting said spokes to the rim, a hub collar fashioned with recesses, the inner ends of said spokes occupying said recesses, blocks fitted adjacent to said collar and between adjacent pairs of spokes for securing the latter to said collar.

2. A resilient wheel comprising a rim, a flanged hub, resilient spokes, means for connecting said spokes to the rim, a hub collar fashioned with recesses, and means for securing the inner ends of said spokes to the latter occupying said recesses, blocks fitted adjacent to said collar and between adjacent pairs of spokes, means passed through said blocks for securing the latter to said collar, and means for securing said blocks to said hub flange.

3. A resilient wheel comprising a rim, a hub provided with flanges, resilient spokes, means for securing the latter to the rim, a hub collar provided with circumferential recesses occupied each by the inner end of one of said spokes, the latter provided each with a shoulder, blocks between each adjacent pair of spokes at said collar and all provided with a shoulder adapted to engage said spoke shoulder, means for securing said blocks to said collar, and distinct means for securing said blocks to said flanges.

4. A resilient wheel comprising a rim, a hub, resilient spokes, means for securing the latter to the rim, a hub collar movable relatively to said hub and provided with circumferential recesses occupied each by the inner end of one of said spokes, the latter provided each with a shoulder, blocks between each adjacent pair of spokes at said collar and all provided with a shoulder adapted in its tightened position to engage said spoke shoulder, and means for maintaining such engagement.

Signed by me, this 30th day of December, 1920.

JAMES R. McFALL.